(12) United States Patent
Singbeil et al.

(10) Patent No.: US 7,231,714 B2
(45) Date of Patent: Jun. 19, 2007

(54) CORROSION-RESISTANT EXTERIOR ALLOY FOR COMPOSITE TUBES

(75) Inventors: Douglas Lloyd Singbeil, Burnaby (CA); Joseph Ralph Kish, Vancouver (CA)

(73) Assignee: FPInnovations, Pointe Claire, Quebec (CA)

( * ) Notice: Subject to any disclaimer, the term of this patent is extended or adjusted under 35 U.S.C. 154(b) by 0 days.

(21) Appl. No.: 11/132,249

(22) Filed: May 19, 2005

(65) Prior Publication Data
US 2005/0260429 A1  Nov. 24, 2005

Related U.S. Application Data

(60) Provisional application No. 60/572,491, filed on May 20, 2004.

(51) Int. Cl.
*B21D 5/24* (2006.01)
*B23P 6/00* (2006.01)
*D21C 11/06* (2006.01)
*D21C 9/00* (2006.01)

(52) U.S. Cl. .......................... 29/890.031; 29/890.051; 162/30.1; 162/30.11; 162/100

(58) Field of Classification Search ................ 428/685; 138/140; 162/100, 30.1, 30.11; 29/890.031, 29/890.043, 890.051
See application file for complete search history.

(56) References Cited

U.S. PATENT DOCUMENTS 4,505,232 A    3/1985   Usami et al.
5,103,870 A    4/1992   Ishii et al.
5,324,595 A *  6/1994   Rosen ........................ 428/679
5,579,628 A   12/1996   Dunbar et al.
5,620,805 A    4/1997   Ogawa et al.
5,879,818 A    3/1999   Kinomura et al.
6,010,581 A *  1/2000   Rosen et al. ................ 148/428
6,337,459 B1   1/2002   Terwijn et al.
6,579,628 B2   6/2003   Takeuchi et al.
6,623,869 B1 * 9/2003   Nishiyama et al. ......... 428/685
2004/0001966 A1 1/2004  Subramanian et al.

FOREIGN PATENT DOCUMENTS

JP         359193264 A    11/1984

OTHER PUBLICATIONS

Howell, D., Silberglitt, R. and Norland, D. "Industrial Materials for the Future R&D Strategies : A Case Study of Boiler Materials for the Pulp and Paper Industry", Oct. 1, 2002 (retrieved on Jun. 21, 2005). Retrieved from the Internet : http://www.osti.gov/bridge/.
Bama, J. and Rivers, K., "Improving Recovery Boiler Furnace Reliability with Advanced Materials and Application Methods" presented to Canadian Pulp and Paper Association, Montreal, 25-29 January 1999, Babcock & Wilcox Technical Paper No. BR-1668.

* cited by examiner

*Primary Examiner*—Michael E. LaVilla
(74) *Attorney, Agent, or Firm*—Ogilvy Renault LLP

(57) ABSTRACT

An austenitic Ni—Cr—Fe alloy is provided as an exterior tube material for improved cracking and corrosion resistance of composite tubes used to construct the lower furnace section of kraft recovery boilers. The alloy consists of essentially, on a weight-% basis, 25-35 Cr, 5-15 Fe and 50-70 Ni, with other minor alloying elements and impurities such as are normally present in commercial alloys. This compositional range includes, as a preferred composition, the range corresponding to the commercial alloy 690 (UNS N06690).

13 Claims, 4 Drawing Sheets

CORROSION-RESISTANT EXTERIOR ALLOY FOR COMPOSITE TUBES

CROSS-REFERENCE TO RELATED APPLICATIONS

This application is related to U.S. Provisional Application Ser. No. 60/572,491 filed May 20, 2004 and the benefit under 35 U.S. C119(e) of such U.S. Provisional Application is claimed.

BACKGROUND OF THE INVENTION i) Field of the Invention

The present invention relates to the use of an austenitic Ni—Cr—Fe alloy as an exterior layer for improved cracking and corrosion resistance of composite tubes used to construct the lower furnace of a kraft (black liquor) recovery boiler.

ii) Description of the Prior Art

A kraft recovery boiler is a chemical reactor which houses a large bed of molten salt. A fuel, consisting of organic residue from the pulping process and spent inorganic cooking chemicals, is fired into the boiler as an aqueous slurry with between 70 and 80% solids content. Corrosion of water wall tubes in kraft recovery boilers represents a significant hazard to the safe operation of the boiler, as contact between the bed of molten salt and water or steam escaping from cracks in the boiler tubes can result in a smelt-water explosion capable of destroying the boiler. One of the most common measures taken to prevent corrosion is the installation of composite tubes to form the boiler walls and floor.

In this context, a composite tube consists of two tubular layers of different materials, one inside the other, joined by a metallurgical bond at the interface between the two. Typically, the inside layer will be made from a carbon steel such as ASTM A-210 or similar. The outer, corrosion-resistant layer of the tube is most often made from UNS S30403 (18-20 Cr, 8-10.5 Ni), bal Fe or, in some cases, variants of either UNS N08825 (38-46 Ni, 19.5-23.5 Cr, 2.5-3.5 Mo) bal Fe or UNS N06625 (20-23 Cr, 0-5 Fe, 8-10 Mo, bal Ni). In addition to the major alloying elements, all of these alloys contain minor amounts of other alloying elements and impurities. The layers can be metallurgically bonded by co-extruding the two materials with a die and mandrel, by welding the outer corrosion resistant layer onto the inner layer, or by depositing, onto the surface of the inner tube, a molten spray of material comprising the composition of the outer layer and allowing it to solidify in place to form the outer layer.

Composite tubes made with UNS S30403 as an outer layer replaced carbon steel tubes in kraft recovery boilers because they possess intrinsically better corrosion resistance, but they have proven susceptible to failure via several different modes, including, but not limited to, general corrosion, thermal fatigue, corrosion fatigue and stress corrosion cracking. Most seriously, cracks have formed in the outer layer of these tubes around primary air port openings, and in locations where they are, or may be, in contact with the smelt bed on the bottom of the boiler. The specific mechanism of cracking has been the subject of many investigations, and a general conclusion has been reached that the mechanism likely varies according to the precise location in the boiler where the cracking occurs.

Replacement tubes made from variants of alloys UNS N08825 and UNS N06625 were introduced into recovery boiler service to alleviate both the cracking and corrosion experienced by composite tubes made with UNS S30403. In particular, the application of UNS N08825 to prevent cracking of boiler bottom tubes was the subject of U.S. Pat. No. 5,324,595. Although improvements in resistance to cracking and corrosion have been noted for each of these alloys in some applications, both have been prone to corrosion and cracking in-service. In fact, none of the alternative materials used thus far represents a universal solution to the various cracking and corrosion found in the lower furnace section of a kraft recovery boiler.

The present invention is based on the discovery of an alloy that offers significantly superior resistance against the combination of cracking and corrosion mechanisms operative in a kraft recovery boiler.

SUMMARY OF THE INVENTION

It is an object of this invention to provide a composite tube, more especially a composite tube having improved corrosion and cracking resistance.

It is a particular object of this invention to provide such a composite tube for furnace walls and floors of a kraft recovery boiler.

A further object of the invention is to provide a kraft recovery boiler employing composite tubes of the invention in a wall or floor of the boiler.

It is a still further object of the invention to provide a method of refurbishing a kraft recovery boiler.

It is yet another object of the invention to provide an improvement in a method of assembling a kraft recovery boiler.

It is yet another object of the invention to provide a method of assembling a black liquor gasifier.

It is a further object of the invention to provide a structure having tubular members exposed to corrosive and cracking stresses.

The present invention provides a composite tube, which has improved cracking and corrosion resistance when compared with those considered in the prior art, for use as a construction material for the lower furnace section of a kraft recovery boiler. This improved tube assembly is comprised of an inner portion of steel, and particularly conventional carbon steel and an outer portion of an austenitic Ni—Cr—Fe alloy, which is comprised of, in weight %:

| | |
|---|---|
| Cr | 25–35 |
| Fe | 5–15 |
| Ni | 50–70 |

Balance any normal minor alloying elements and impurities as present in commercial alloys This compositional range includes, as a preferred composition range, that corresponding to the commercial Ni—Cr—Fe alloy 690 (UNS N06690), which is comprised of in weight %:

| | |
|---|---|
| Cr | 27–31 |
| Fe | 7–11 |
| Ni | 58 min |
| C | 0.05 |
| Si | 0.50 |
| Mn | 0.50 |
| S | 0.015 |
| Cu | 0.50 |

For brevity, the range of alloys encompassed by this invention is described hereinafter as 30Cr-60Ni.

This invention is particularly useful in protecting those composite tubes that need to be bent in order to form the spout ports and the air ports in a kraft recovery boiler or similar structure.

It is a specific objective of the present invention to avoid or alleviate the cracking and corrosion problems of the prior art and to provide enhanced safety and longevity of composite tubes in the lower furnace section of kraft recovery boilers.

Thus, in one aspect of the invention, there is provided a composite tube comprising an inner layer and an outer layer, the inner layer being of steel, especially a carbon steel, for example that of ASTM A-210; and the outer layer being comprised of the composition of Cr, Fe and Ni indicated hereinbefore, with unavoidable or controlled levels of impurities and alloying elements such as, but not restricted to, C, Si, Mn, S and Cu.

Such unavoidable impurities and alloying elements are typically in a total amount of not more than a few weight percent, and are elements and impurities resulting from normal or commercial fabrication techniques, and which are either necessarily present to meet requirements for physical properties and processing of the alloy or cannot be avoided in the absence of exceptional processing steps.

Such minor amounts of unavoidable impurities and alloying elements are benign and have no significant deleterious effect on the alloy in its intended area of use.

In another aspect of the invention, there is provided in a kraft recovery boiler having metal tubes subject to corrosive and cracking forces, in a wall or floor of the boiler, the improvement wherein at least some of the tubes comprise composite tubes of the invention.

In still another aspect of the invention, there is provided a method of refurbishing a kraft recovery boiler having metal tubes subject to corrosive and cracking forces, in a wall or floor of the boiler, comprising removing said metal tubes and installing in their place composite tubes of the invention.

In still another aspect of the invention, there is provided a method of assembling a kraft recovery boiler in which a boiler wall or floor subject to corrosive and cracking forces is constructed with metal tubes, the improvement wherein said metal tubes are composite tubes of the invention.

In still another aspect of the invention, there is provided in a structure having tubular members exposed to corrosive and cracking forces, the improvement wherein said tubular members comprise composite tubes of the invention.

DESCRIPTION OF PREFERRED EMBODIMENTS WITH REFERENCE TO THE DRAWINGS

Figure 1:
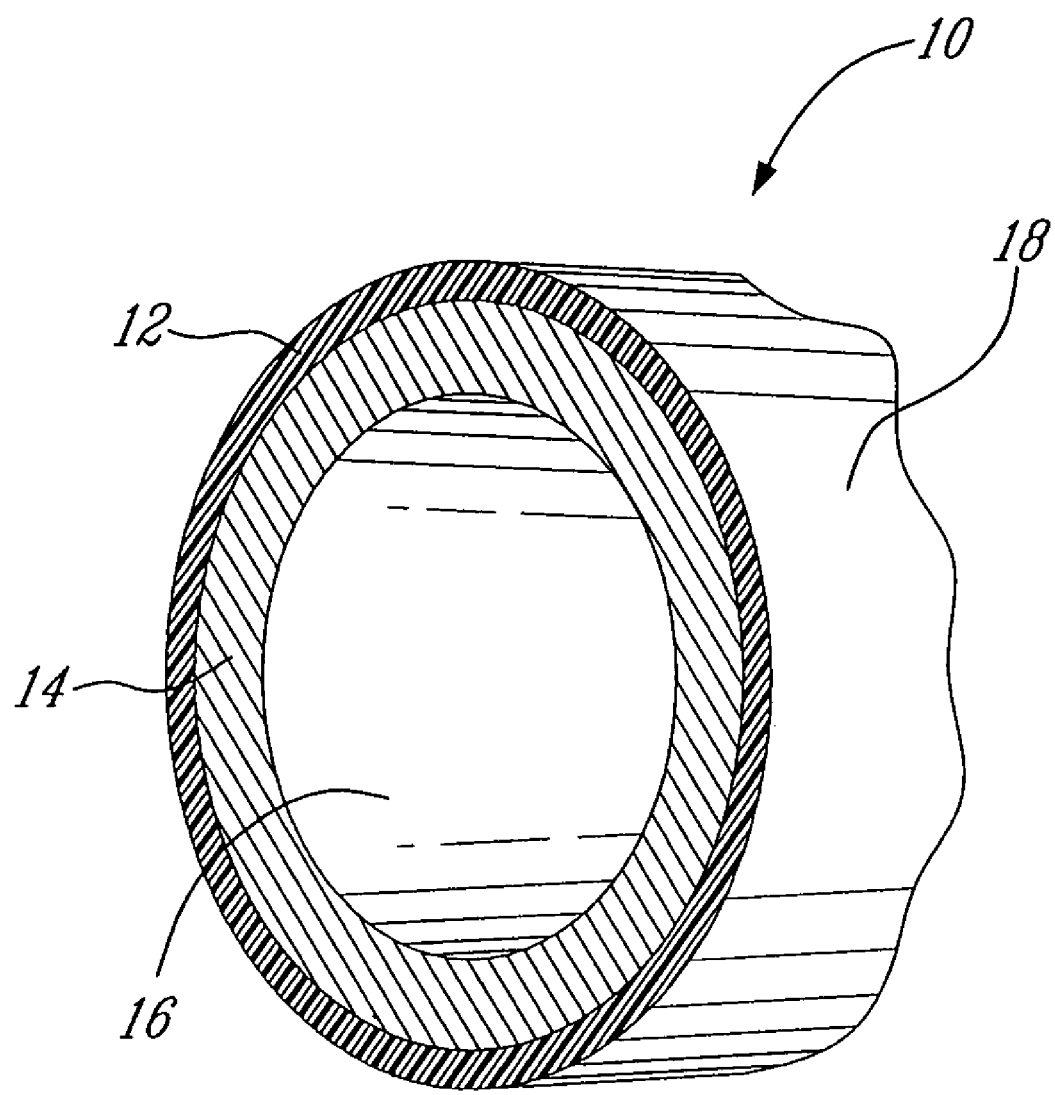
FIG. 1 illustrates schematically a tube of the invention.

With further reference to FIG. 1, a composite tube 10 has an outer layer 12 of Ni—Cr—Fe alloy 690 on an inner carbon steel tube forming an inner layer 14. Inner layer 14 defines a tubular passage 16 for flow of cooling water. Outer layer 12 defines an outer surface 18 which in use may be exposed to molten mass of salts.

Figure 4:
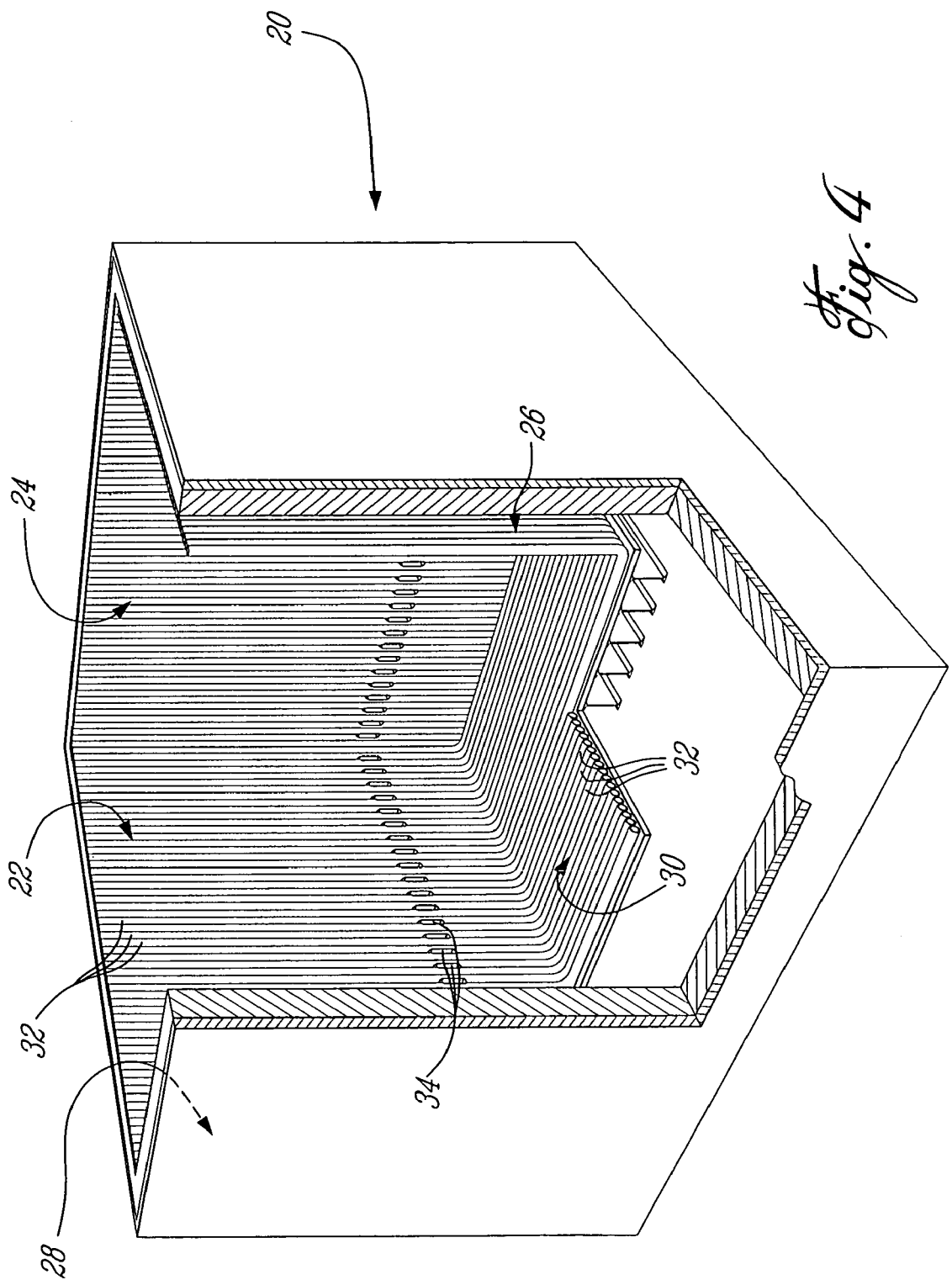
FIG. 4 illustrates schematically part of a kraft recovery boiler employing tubes of the invention.

With reference to FIG. 4, a kraft recovery boiler 20 has boiler walls 22, 24, 26 and 28 and a floor 30 formed of water-cooled tubes 32, at least some of which are composite tubes 10 of FIG. 1.

A multiplicity of air ports 34 are shown in walls 22 and 24. Similar air ports (not shown) are present in walls 26 and 28.

Figure 3:
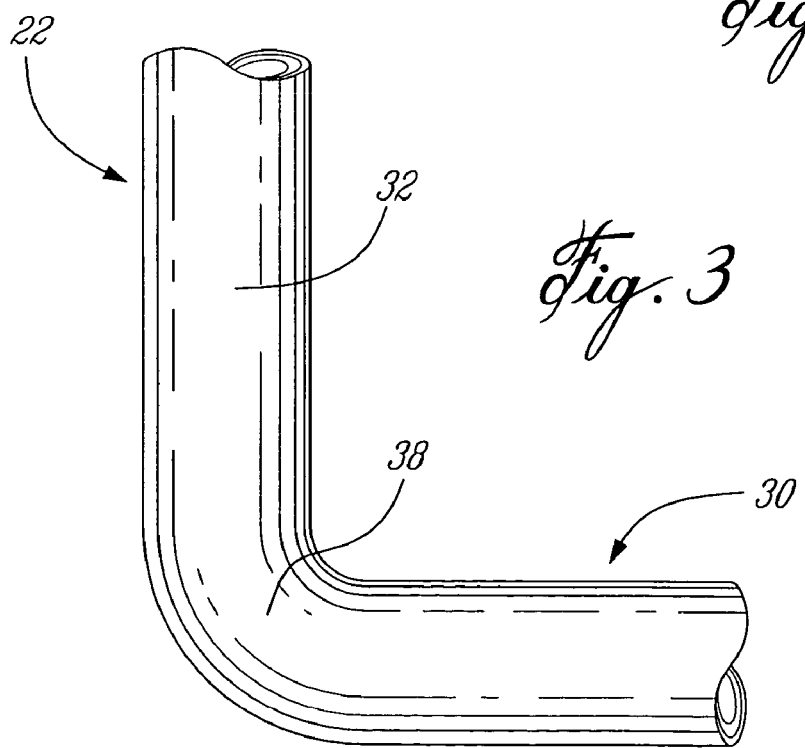
FIG. 3 shows a detail of a tube at the juncture between wall and floor in the boiler of FIG. 4.

Opposed walls 22 and 26 and the intervening floor 30 are formed from a plurality of tubes 32, which are bent at the juncture of wall 22 and floor 30, and wall 26 and floor 30 as illustrated in the detail shown in FIG. 3.

Figure 2:
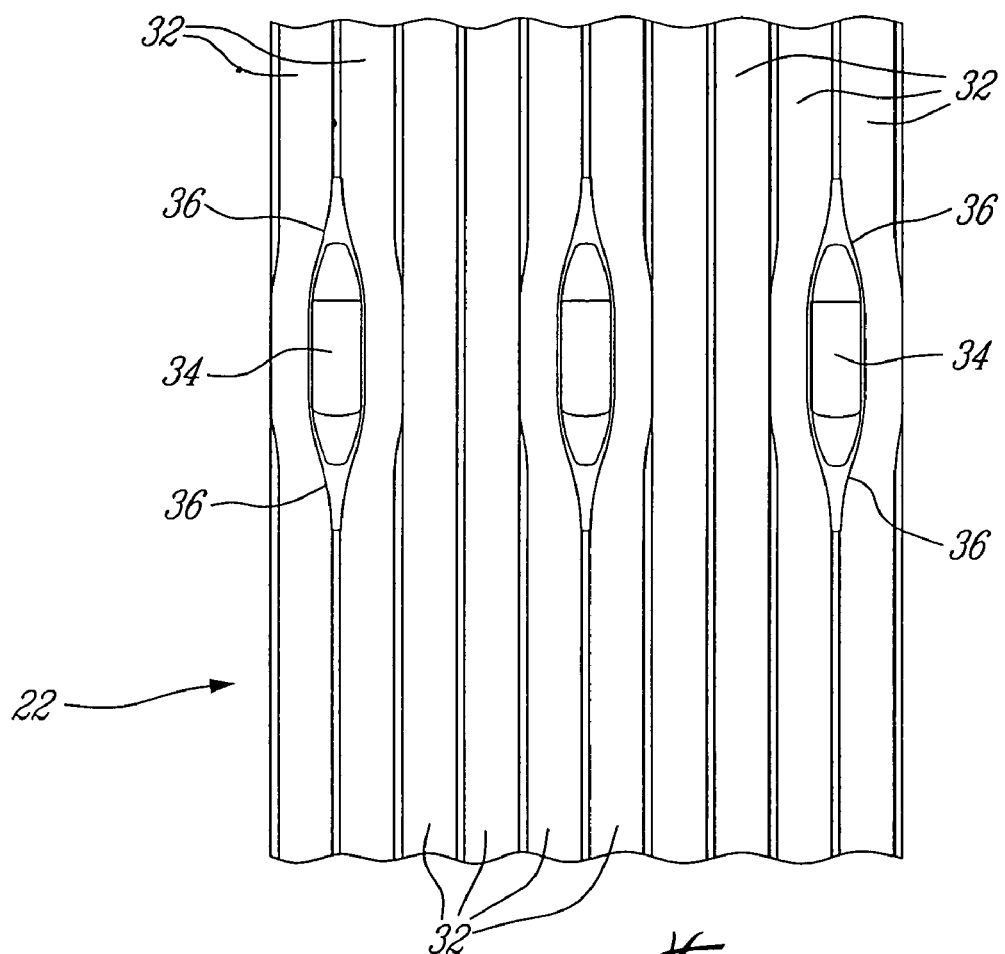
FIG. 2 shows a detail of a wall of tubes in the boiler of FIG. 4.

The tubes 32 are also bent, deformed or shaped, in the region of the air ports 34 as illustrated in the detail shown in FIG. 2.

Boiler 20 may also include smelt spout openings and other air port openings at different levels, not shown. The structure of boiler 20 is conventional, differing from prior boilers only in the employment of at least some composite tubes 10 of the invention as tubes 32.

With further reference to FIG. 2, there is shown tubes 32 of wall 22 in the boiler of FIG. 2, which tubes 32 are bent, deformed or shape about the air ports 34, in regions 36.

With further reference to FIG. 3 there is shown a tube 32 forming part of wall 22 and floor 30 of boiler 20 in FIG. 2 there being a bend 38 in the tube 32 at the juncture of wall 22 and floor 30.

In general, the regions 36 and the bends 38 present particular problems as a result of stress corrosion, cracking and corrosion fatigue.

Figure 5:
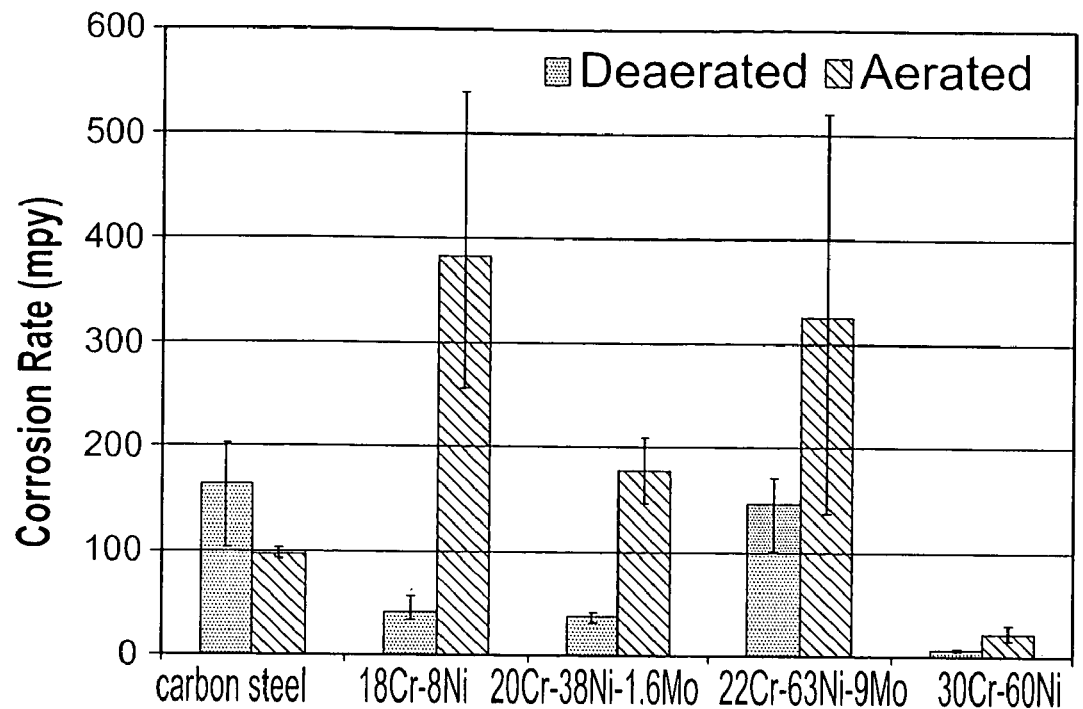
FIG. 5 is a graph that shows the corrosion rate of alloys exposed to molten hydrated salts typical of those that might be found on the fireside surface of a recovery boiler tube. For each alloy, tests were conducted under deaerated and aerated conditions. The alloys shown in the graph are representative of the classes of alloys exposed to the fireside environment in a recovery boiler.
Figure 6:
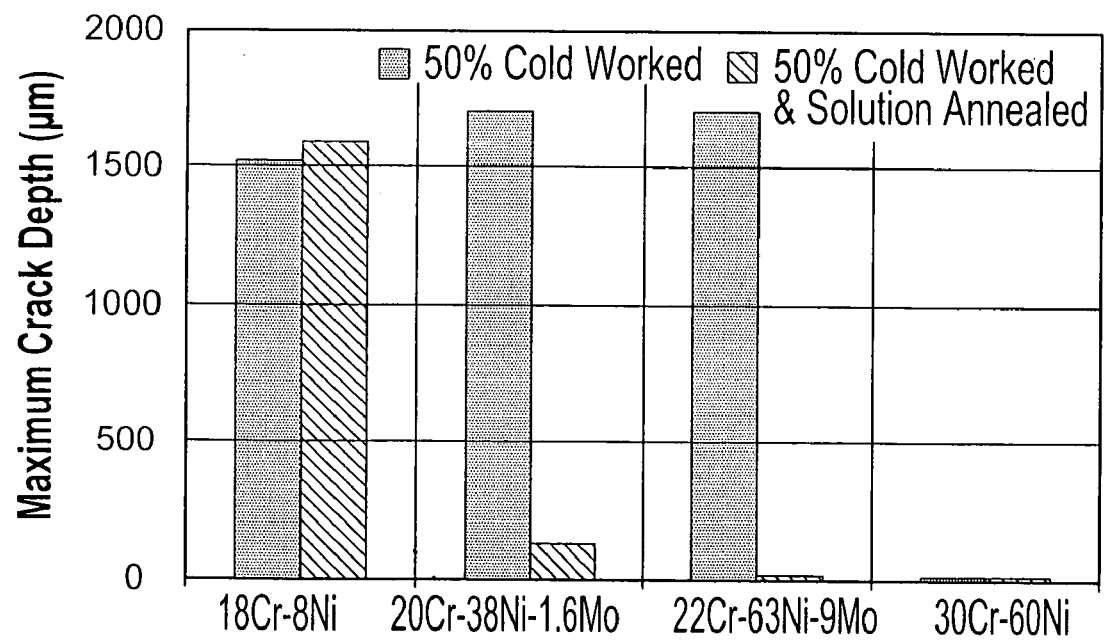
FIG. 6 is a graph that shows the maximum depth of crack propagation measured in U-bend samples of these alloys when exposed to the same hydrated molten salts for a fixed period of time. The graph shows the depth of crack penetration after the alloys have been subject to a reduction in thickness before being bent (50% cold work) and after being cold worked, and then stress-relief annealed.

FIGS. 5 and 6 show the improved results achieved with a composite tube in accordance with the invention as compared with prior art tubes.

DETAILED DESCRIPTION OF THE INVENTION

Composite tubes in kraft recovery boilers are susceptible to failure via several different modes, including, but not limited to, general corrosion, corrosion fatigue, and stress corrosion cracking. All materials that are currently used to manufacture composite tubes are prone to failure via one or more of these mechanisms. The present invention is based on the discovery that an alloy containing 25-35 wt % Chromium, 5-15 wt % Iron and 50-70 wt % Nickel (30Cr-60Ni), including the commercial Ni—Cr—Fe alloy 690 (UNS N06690) can better satisfy the complete set of requirements for resistance to these modes of corrosion by the exterior layer of composite tubes than those considered in the prior art.

Specific details and advantages of the present invention will appear from the following description of a selection process that has been carried out. A tube material that offers a universal corrosion-resistant solution in kraft recovery boilers must jointly satisfy several requirements at once, including resistance to thermal fatigue, corrosion fatigue, stress corrosion cracking and corrosion. A key to the selection process is the understanding of the nature of the stress corrosion cracking and corrosion mechanisms and thereby devising tests that best simulates the actual environmental conditions within the lower furnace section. It is in these tests that the surprising performance of the composite tubes of the present invention was realised.

Thermal fatigue, corrosion fatigue and stress corrosion cracking require a source of tensile stress to be imposed on the component of the tube which has cracked. The stress may come from differences of thermal expansion of the component materials of the tube or from residual or mechanical stresses imposed on the tube by fabrication and operation. To avoid the former, it is important to minimize the difference in coefficient of thermal expansion between the two materials that make up a composite tube. Of the alloys commonly used to make composite tubes, 18Cr-8Ni is least compatible with the carbon steel component of the tube. 20Cr-38Ni-1.6Mo has a similar coefficient of linear expansion as carbon steel, but the coefficient of linear expansion for 30Cr-60Ni and 22Cr-63Ni-9Mo are even more similar to carbon steel.

Rosen (U.S. Pat. No. 5,324,595) teaches that a composite tube containing 20Cr-38Ni-1.6Mo as an outer component is an improvement for use as floor tubes in a recovery boiler based on a selection process that considered both thermal fatigue resistance and differences in thermal expansion coefficients as the key criteria. The results for this alloy were much better than for 18Cr-8Ni. In other examples of prior art, alloys even more resistant to thermal fatigue than 20Cr-38Ni-1.6Mo are also used as outer components of composite tubes in recovery boilers, particularly those containing about 22Cr-63Ni-9Mo.

Alloys within the composition range that is the subject of this invention also have much better resistance to thermal fatigue than 18Cr-8Ni, and nearly the same as 20Cr-38Ni-1.6Mo.

Advantages of the present invention were discovered when tests specific to the stress corrosion cracking and corrosion mechanisms in a kraft recovery boiler were employed. For example, corrosion of many alloys, including those of groups containing 20Cr-38Ni-1.6Mo and 22Cr-63Ni-9Mo has occurred at the bends of tubes that make air port openings, where combustion air is injected into the cavity of the boiler. As seen in FIG. 5, an alloy of the present invention is substantially more resistant to corrosion than any of the others, especially in the presence of air.

In other, related tests, samples of the alloy groups were first treated by cold-reduction to 50% of their original thickness to simulate forces imposed on the tubes during manufacture when they are bent to form the openings for the air ports. These samples were then artificially bent into a U-shape to produce high tensile stresses on the outer surface, and exposed to a mixture of molten salts, typically sodium carbonate, NaOH, $Na_2S$ and water vapour, which are found in recovery boilers. A second set of samples was reduced in thickness as described previously, and then solution annealed to remove the effects of the mechanical treatment. These samples were also bent into a U-shape and exposed to the same salt mixture as the other samples. As seen in FIG. 6, only an alloy of this invention is resistant to cracking in these tests.

Alloys that fall within the range of composition that is the subject of this invention were discovered to possess unique resistance to corrosion and stress corrosion cracking in an environment that simulated exposure to the interior of a kraft recovery boiler. Since they also possess the same positive characteristics of thermal fatigue resistance and difference of coefficient of thermal expansion of other alloys used in this service, this invention offers significant advantages when used as the outer component of composite tubes to manufacture the lower furnace and floors of a kraft recovery boiler. Particularly, this invention is superior when applied to composite tubes that are bent to form openings for the combustion air injected into the furnace, or to make smelt openings that allow the molten salts to exit the furnace.

Additionally, composite tubes made with an outer layer composed of an alloy within the compositional range covered by this invention, provide superior service in other applications where the same corrosion and cracking mechanisms may apply. These include, but are not limited to cooled or uncooled surfaces exposed to hot liquor and smelt within black liquor gasifiers, for example, as cooled screen tubes, quench ring supports and for green liquor containment.

While a typical embodiment of this invention would be to make a composite tube by co-extrusion with an outer layer of alloy that contains between 25–35Cr, 5–10 Fe, and balance Ni (except for normal minor alloying elements and impurities) and an inner layer of carbon steel, the manufacture of the tube can be by any method that leaves a layer of the alloy of the invention on the surface of the inner component, for example, by applying the alloy of the invention onto the carbon steel tube by weld overlay, or by spraying a molten mixture onto the surface of the carbon steel core.

Various thicknesses of the inner and outer layers of the composite tube of the invention may be used, which depend on the method of fabrication and the mandated thickness of the inner carbon steel layer. Generally, the outer layer will have a thickness of between 0.020 in. and 0.10 in., and preferably between 0.050 in. and 0.080 in. The carbon steel tube forming the inner layer typically has an outer diameter of about 2.5 or 3.0 in., and a thickness of between about 0.18 to 0.25 in.

The employment of tubular members in kraft recovery boilers is well known to persons in the art, for illustration reference is made to FIG. 1 of U.S. Pat. No. 5,324,595 and the description of FIG. 1 therein showing a related type of boiler, i.e. a soda recovery boiler, incorporated herein by reference.

The invention claimed is:

1. In a kraft recovery process in which kraft chemicals are recovered from black liquor in a kraft recovery boiler having metal tubes subject to corrosive and cracking forces of the kraft recovery process, in a wall or floor of the boiler, wherein the improvement comprises that at least some of the tubes comprise composite tubes comprising an inner layer and an outer layer, said inner layer being of steel and said outer layer being comprised of, in weight %: 25 to 35% Cr, 5 to 15% Fe and 50–70% Ni, with minor amounts of other unavoidable impurities and alloying elements.

2. In the kraft recovery process of claim 1, wherein the improvement comprise that the Cr content of said outer layer is 27 to 31%, the Fe content of said outer layer is 7 to 11% and the Ni content is at least 58%, and the inner layer is of carbon steel.

3. In the kraft recovery process of claim 1, wherein the improvement comprises that said composite tubes axe in a lower part of the boiler exposed in use to molten salts.

4. In the kraft recovery process of claim 1, wherein the improvement comprises that said composite tubes define air port openings or smelt spout openings in said boiler.

5. In the kraft recovery process according to claim 1, wherein the improvement comprises that the Cr content of said outer layer is 27 to 31%, the Fe content of said outer layer is 7 to 11%, and the Ni content is at least 58%.

6. In the kraft recovery process according to claim 1, wherein the improvement comprises that said inner layer is of carbon steel.

7. In the kraft recovery process according to claim 6, wherein the improvement comprises that said carbon steel is ASTM A-210.

8. In the kraft recovery process according to claim 1, wherein the improvement comprises that said outer layer is of a Ni—Cr—Fe and alloy comprising in weight %, Cr 27–31%, Fe and 7–11% nickel at least 58% C 0.05%, Si 0.50%, Mn 0.50%, S 0.015%, and Cu 0.50%.

9. A method of refurbishing a kraft recovery boiler having metal tubes subject to corrosive and cracking forces, in a wail or floor of the boiler, comprising conducting a kraft recovery process in which kraft chemicals are recovered from black liquor in the kraft recovery boiler having said metal tubes subject to corrosive and cracking forces of the kraft recovery process, and removing said metal tubes and installing in their place composite tubes comprising an inner layer and an outer layer, said inner layer being of steel and said outer layer being comprised of, in weight %: 25 to 35% Cr, 5 to 15% Fe and 50–70% Ni, with minor amounts of other unavoidable impurities and alloying elements.

10. A method according to claim 9, wherein the Cr content of said outer layer is 27 to 31%, the Fe content of said outer layer is 7 to 11%, the Ni content is at least 58%, and the inner layer is of carbon steel.

11. A method according to claim 9, wherein said inner layer is of carbon steel.

12. A method according to claim 11, wherein said carbon steel is ASTM A-210.

13. A method according to claim 12, wherein said outer layer is of a Ni—Cr—fe alloy, comprising in weight %, Cr 27–31%, Fe 7–11% nickel at least 58% C 0.05%, Si 0.50%, Mn 0.50%, S 0.015%, and Cu 0.050%.

* * * * *